United States Patent
Park et al.

(10) Patent No.: US 12,140,831 B2
(45) Date of Patent: Nov. 12, 2024

(54) COVER WINDOW FOR FLEXIBLE DISPLAY DEVICE AND FLEXIBLE DISPLAY DEVICE

(71) Applicant: LG CHEM, LTD., Seoul (KR)

(72) Inventors: Jin Young Park, Daejeon (KR); Yunah Yu, Daejeon (KR); Duk Hun Jang, Daejeon (KR); Yongjoon Heo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 874 days.

(21) Appl. No.: 15/734,968

(22) PCT Filed: Oct. 25, 2019

(86) PCT No.: PCT/KR2019/014202
§ 371 (c)(1),
(2) Date: Dec. 3, 2020

(87) PCT Pub. No.: WO2020/085868
PCT Pub. Date: Apr. 30, 2020

(65) Prior Publication Data
US 2021/0240226 A1 Aug. 5, 2021

(30) Foreign Application Priority Data

Oct. 26, 2018 (KR) ........................ 10-2018-0129193

(51) Int. Cl.
*G02F 1/1333* (2006.01)
*C08G 73/10* (2006.01)
(Continued)

(52) U.S. Cl.
CPC ... *G02F 1/133331* (2021.01); *C08G 73/1039* (2013.01); *C08G 73/1067* (2013.01);
(Continued)

(58) Field of Classification Search
CPC ......... C08L 79/08; C08G 73/14; B32B 27/34; B32B 27/281; G02F 1/133305; G06F 1/1652
See application file for complete search history.

(56) References Cited

U.S. PATENT DOCUMENTS

| | | |
|---|---|---|
| 9,200,117 B2 | 12/2015 | Cho et al. |
| 9,796,816 B2 | 10/2017 | Cho et al. |
| (Continued) | | |

FOREIGN PATENT DOCUMENTS

| | | |
|---|---|---|
| CN | 104487494 A | 4/2015 |
| CN | 105754127 A | 7/2016 |
| (Continued) | | |

OTHER PUBLICATIONS

International Search Report for PCT/KR2019/014202 dated Feb. 12, 2020, 5 pages.

*Primary Examiner* — Sophie Hon
(74) *Attorney, Agent, or Firm* — ROTHWELL, FIGG, ERNST & MANBECK, P.C.

(57) ABSTRACT

The present disclosure relates to a cover window for a flexible display device and a flexible display device including the cover window, wherein the cover window includes a polymer substrate including a polyamideimide block copolymer; and a hard coating layer formed on at least one surface of the polymer substrate and having a pencil hardness of 5H or more under a load of 750 g, and no crack occurs when wound on a mandrel having a diameter of 3 mm.

10 Claims, 1 Drawing Sheet

(51) Int. Cl.
*C08G 73/14* (2006.01)
*C08L 79/08* (2006.01)
*G02B 1/04* (2006.01)
*G02B 1/14* (2015.01)
*G06F 1/16* (2006.01)

(52) U.S. Cl.
CPC .............. *C08G 73/14* (2013.01); *C08L 79/08* (2013.01); *G02B 1/04* (2013.01); *G02B 1/14* (2015.01); *G06F 1/1652* (2013.01); *C09K 2323/06* (2020.08)

(56) References Cited

U.S. PATENT DOCUMENTS

| | | | |
|---|---|---|---|
| 10,118,371 | B2 | 11/2018 | Kim et al. |
| 10,233,355 | B2 | 3/2019 | Kim et al. |
| 10,370,495 | B2 | 8/2019 | Park et al. |
| 10,508,218 | B2 | 12/2019 | Lee et al. |
| 10,626,292 | B2 | 4/2020 | Kim et al. |
| 2012/0296050 | A1* | 11/2012 | Cho .................... C09D 179/08 264/165 |
| 2015/0132552 | A1 | 5/2015 | Kang et al. |
| 2015/0140279 | A1 | 5/2015 | Kang et al. |
| 2016/0194448 | A1 | 7/2016 | Song et al. |
| 2016/0222166 | A1 | 8/2016 | Ahn et al. |
| 2018/0112049 | A1* | 4/2018 | Song .................... C08G 69/40 |
| 2018/0113350 | A1 | 4/2018 | Jee et al. |
| 2018/0148543 | A1 | 5/2018 | Chae et al. |
| 2018/0201000 | A1 | 7/2018 | Kim et al. |
| 2018/0201002 | A1* | 7/2018 | Kim ........................ B32B 27/08 |
| 2018/0230278 | A1 | 8/2018 | Han et al. |
| 2019/0010291 | A1 | 1/2019 | Choi et al. |
| 2019/0077915 | A1 | 3/2019 | Yun et al. |
| 2019/0153260 | A1 | 5/2019 | Kim et al. |
| 2019/0217587 | A1 | 7/2019 | Sawamoto et al. |
| 2020/0216713 | A1 | 7/2020 | Kim et al. |

FOREIGN PATENT DOCUMENTS

| | | | | |
|---|---|---|---|---|
| CN | 108473678 | A | 8/2018 | |
| JP | H07-165915 | A | 6/1995 | |
| JP | 2018-066002 | A | 4/2018 | |
| JP | 7414014 | B2 * | 1/2024 | ........... B32B 15/088 |
| KR | 10-2013-0135154 | A | 12/2013 | |
| KR | 10-1523730 | B1 | 5/2015 | |
| KR | 10-2016-0024003 | A | 3/2016 | |
| KR | 10-2016-0095910 | A | 8/2016 | |
| KR | 10-2017-0016299 | A | 2/2017 | |
| KR | 10-1729731 | B1 | 4/2017 | |
| KR | 10-2018-0018306 | A | 2/2018 | |
| KR | 10-2018-0044189 | A | 5/2018 | |
| KR | 10-2018-0059216 | A | 6/2018 | |
| KR | 10-2018-0093655 | A | 8/2018 | |
| KR | 102308709 | B1 * | 10/2021 | ........ G02F 1/133331 |
| WO | WO-2017023119 | A1 * | 2/2017 | ............ B32B 27/08 |
| WO | 2017-209413 | A1 | 12/2017 | |
| WO | 2017-221783 | A1 | 12/2017 | |

\* cited by examiner

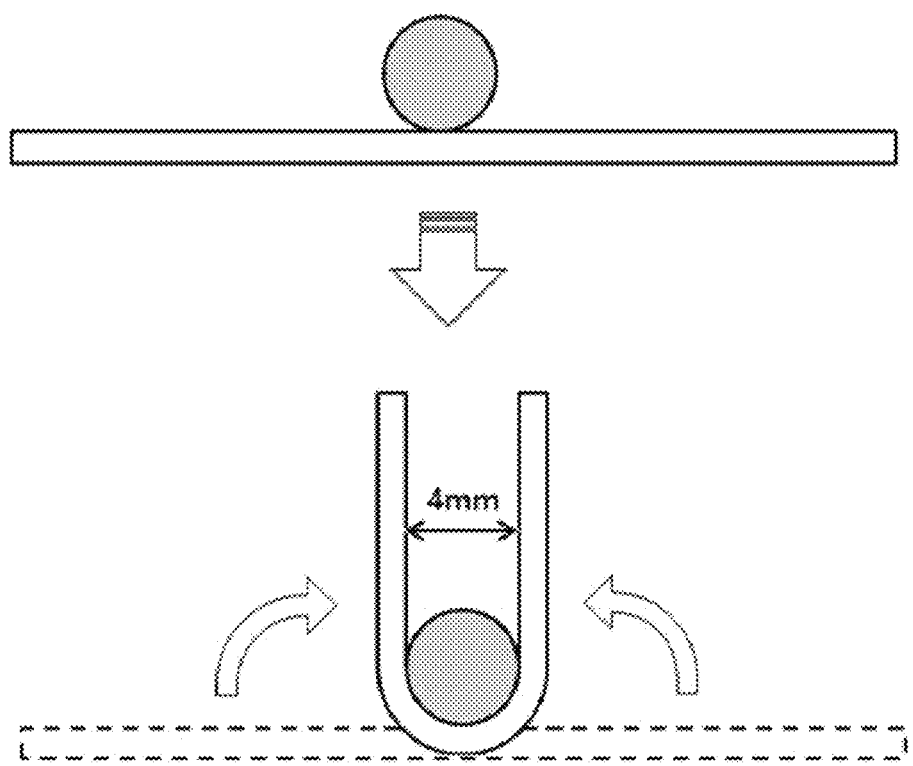

COVER WINDOW FOR FLEXIBLE DISPLAY DEVICE AND FLEXIBLE DISPLAY DEVICE

CROSS-REFERENCE TO RELATED APPLICATION

This application is a 35 U.S.C. 371 National Phase Entry Application from PCT/KR2019/014202, filed on Oct. 25, 2019, designating the United States, which claims the benefits of Korean Patent Application No. 10-2018-0129193 filed on Oct. 26, 2018 with the Korean Intellectual Property Office, the disclosures of which are incorporated herein by reference in their entirety.

TECHNICAL FIELD

The present disclosure relates to a cover window for a flexible display device and a display device.

BACKGROUND OF THE INVENTION

Recently, with the development of mobile devices such as smartphones and tablet PCs, thinning and slimming of substrates for display are required. Glass or tempered glass is commonly used as a material having excellent mechanical properties on windows or front boards for displays of mobile devices. However, the glass causes the weight increase of the mobile devices due to its own weight, and has a problem of breakage due to an external impact.

Accordingly, the research for plastic resin is actively underway as a material which can replace the glass. A plastic resin film is lightweight and less fragile, and thus is suitable for the trend of pursuing lighter mobile devices. Specifically, in order to arrive at a film having high hardness and abrasion resistance, films coated with a hard coating layer made of plastic resins on the substrate have been proposed.

As a method of improving the surface hardness of the hard coating layer, a method of increasing the thickness of the hard coating layer can be considered. In order to ensure the surface hardness enough to replace the glass, the hard coating layer needs to have a certain thickness. However, as the thickness of the hard coating layer is increased, the surface hardness may be increased but larger wrinkles or curls are formed due to curing shrinkage of the hard coating layer, and at the same time cracking and peeling of the hard coating layer are likely to occur. Therefore, it may not be easily applied into practice.

Meanwhile, a display in which a part of the display device is bent or flexibly warped for aesthetic and functional reasons has recently been attracting attention, and this tendency is noticeable particularly in mobile devices such as smartphones and tablet PCs. However, since glass is not suitable for use as a cover plate for protecting such a flexible display, it needs to be replaced with a plastic resin or the like. However, for that purpose, it is not easy to produce a film having sufficient flexibility while exhibiting a glass level of high hardness.

BRIEF SUMMARY OF THE INVENTION

In the present disclosure, there is provided a cover window for a flexible display device that exhibits high hardness while satisfying a property balance of flexibility and high hardness at the same time, and is hardly damaged by repetitive bending or folding operations, thereby easily applied to a bendable, flexible, rollable, or foldable mobile device, or display device.

In the present disclosure, there is also provided a flexible display device including the cover window.

In the present disclosure, there is provided a cover window for a flexible display device including a polymer substrate including a polyamideimide block copolymer having a repeating unit containing an aromatic group; and a hard coating layer formed on at least one surface of the polymer substrate and having a pencil hardness of 5H or more under a load of 750 g, wherein no crack occurs when wound on a mandrel having a diameter of 3 mm.

In the present disclosure, there is also provided a flexible display device including the above cover window for a flexible display device.

DETAILED DESCRIPTION OF THE INVENTION

Hereinafter, the cover window for a flexible display device and the flexible according to specific embodiments of the present disclosure will be described in more detail.

In the present disclosure, "flexible" means a state having flexibility to such an extent that cracks of 3 mm or more in length do not occur when wound on a cylindrical mandrel having a diameter of 3 mm. Therefore, the flexible plastic film of the present disclosure can be applied to a cover film of a bendable, flexible, rollable, or foldable display.

According to an embodiment of the present disclosure, there is provided a cover window for a flexible display device including a polymer substrate including a polyamideimide block copolymer having a repeating unit containing an aromatic group; and a hard coating layer formed on at least one surface of the polymer substrate and having a pencil hardness of 5H or more under a load of 750 g, wherein no crack occurs when wound on a mandrel having a diameter of 3 mm. Herein, the polyamideimide block copolymer may include an imide block having an imide repeating unit containing an aromatic tetravalent functional group; and an amide block having an amide repeating unit containing an aromatic divalent functional group, and at least one fluorine-containing functional group may be substituted in at least one of the imide repeating unit containing the aromatic tetravalent functional group and the amide repeating unit containing the aromatic divalent functional group.

The present inventors conducted a study on an optical laminate applicable to a flexible display device having a thinner thickness, and prepared a cover window for a flexible display device including a polymer substrate including a polyamideimide block copolymer having a repeating unit containing an aromatic group; and a hard coating layer formed on at least one surface of the polymer substrate and having a pencil hardness of 5H or more under a load of 750 g, wherein no crack occurs when wound on a mandrel having a diameter of 3 mm.

In addition, they confirmed through experiments that the cover window for a flexible display device exhibits high hardness while satisfying a property balance of flexibility and high hardness at the same time, and is hardly damaged by repetitive bending or folding operations, thereby easily applied to a bendable, flexible, rollable, or foldable mobile device, or display device. And they have completed the invention.

Since the cover window for a flexible display device may have sufficient properties to replace tempered glass, or the like, it may not only be broken by pressure or force applied from the outside, but also may have characteristics of being sufficiently bent and folded.

Physical properties such as bending durability and surface hardness of the cover window for a flexible display device can be achieved by applying a polymer substrate including a polyamideimide block copolymer having a repeating unit containing an aromatic group and a hard coating layer having a pencil hardness of 5H or more under a load of 750 g together to have a crack-free characteristic when wound on a mandrel having a diameter of 3 mm.

In particular, as the cover window for a flexible display device includes the polymer substrate including a polyamideimide block copolymer having a repeating unit containing an aromatic group, it may have optical properties such as high transparency along with excellent mechanical properties and heat resistance. In addition, due to the structure of the polyamideimide block copolymer having a repeating unit containing an aromatic group, it is possible to simultaneously satisfy a property balance of flexibility and high hardness, and it is possible to prevent damage to the internal structure by repetitive bending or folding operations.

Specifically, a yellow index of the polymer substrate measured in accordance with ASTM D1925 may be 4.5 or less, or 3.8 or less, and a haze of the polymer substrate measured in accordance with ASTM D1003 may be 1.1% or less, or 0.4 to 0.8%, thereby having colorless and transparent optical properties.

In addition, the polymer substrate may have an elastic modulus of 5 GPa or more, or 5 to 10 GPa, measured at a strain rate of 12.5 mm/min for a sample having a thickness of 50±21 µm, thereby having excellent mechanical properties, high elasticity and folding resistance.

Meanwhile, the cover window for a flexible display device of the above embodiment may have a light transmittance of 90.0% or more, and a haze of 1.0% or less, 0.7% or less, or 0.5% or less.

As described above, the polyamideimide block copolymer included in the polymer substrate may have a repeating unit containing an aromatic group, and may also have a functional group containing fluorine together with the aromatic group.

More specifically, the polyamideimide block copolymer may include an imide block having an imide repeating unit containing an aromatic tetravalent functional group; and an amide block having an amide repeating unit containing an aromatic divalent functional group, wherein at least one fluorine-containing functional group may be substituted in at least one of the imide repeating unit containing the aromatic tetravalent functional group and the amide repeating unit containing the aromatic divalent functional group.

The above-described polyamideimide block copolymer will be described in more detail.

The polyamideimide block copolymer can simultaneously improve thermal, mechanical and optical properties of the copolymer by introducing a specific structure into the repeating unit included in the amide block. Concretely, it was confirmed that when diacyl halide, dicarboxylic acid and dicarboxylate compounds are respectively limited to specific structures and a molar ratio thereof is limited, optical properties of the polyamide-imide copolymer can be improved while maintaining excellent mechanical properties and heat resistance.

More specifically, the polyamideimide block copolymer may include an imide block having a first repeating unit represented by the following Chemical Formula 1; and an amide block having at least one selected from the group consisting of a second repeating unit represented by the following Chemical Formula 2 and a third repeating unit represented by the following Chemical Formula 3.

(i) The Imide-Derived Repeating Unit: The First Repeating Unit

[Chemical Formula 1]

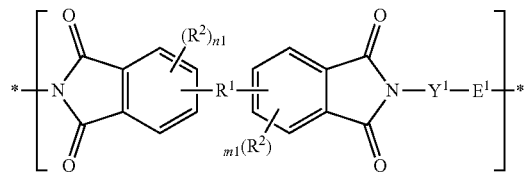

in Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a C6 to C30 divalent aromatic organic group;

each $R^2$ is the same as or different from each other in each repeating unit, and each is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are each independently an integer of 0 to 3;

each $Y^1$ is the same as or different from each other in each repeating unit, and each independently comprises a C6 to C30 divalent aromatic organic group containing at least one trifluoromethyl group (—CF$_3$); and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, or —C(=O)NH—; and each $E^1$ is independently a single bond, or —NH—;

Herein, the single bond means a case that $R^1$ in Chemical Formula 1 is a chemical bond which simply links the groups on both sides.

Each $R^2$ is the same as or different from each other in each repeating unit, and each may independently be —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

n1 and m1 may each independently be an integer of 0 to 3.

Each $Y^1$ is the same as or different from each other in each repeating unit, and each may independently be a C3 to C10 aliphatic organic group.

Each $E^1$ may independently be a single bond, or —NH—.

Herein, the single bond means a case that $E^1$ is a chemical bond which simply links the groups on both sides.

Preferably, the first repeating unit may include a repeating unit represented by the following Chemical Formula 1-1:

[Chemical Formula 1-1]

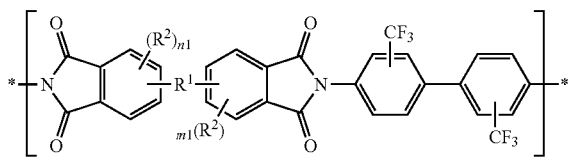

in Chemical Formula 1-1, $R^1$, $R^2$, n1 and m1 are as defined in the Chemical Formula 1.

In addition, the polyamideimide block copolymer may include an amide block having at least one selected from the group consisting of a second repeating unit represented by the following Chemical Formula 2 and a third repeating unit represented by the following Chemical Formula 3.

In the polyamideimide block copolymer, a molar ratio of the second repeating unit:the third repeating unit may be 10:90 to 50:50.

Since the molar ratio of the second repeating unit:the third repeating unit included in the polyamideimide block copolymer is 10:90 to 50:50, the polyamideimide block copolymer may have a polymer internal structure (feature) capable of improving elasticity while maintaining high mechanical properties. Accordingly, it is possible to provide a polymer material or film which is easy to form a film because of its excellent processability, while being colorless and transparent and having excellent mechanical properties. In addition, by satisfying the molar ratio described above, dimensional stability against water absorption can be relatively improved while having a fluorine content equivalent to that of a random copolymer.

(ii) The Amide-Derived Repeating Unit: The Second Repeating Unit and the Third Repeating Unit

[Chemical Formula 2]

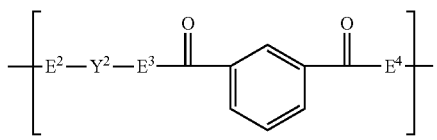

[Chemical Formula 3]

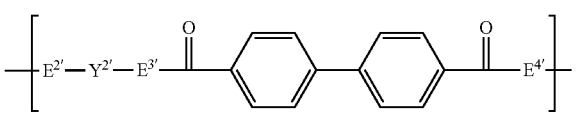

in Chemical Formulae 2 and 3, $Y^2$ and $Y^{2'}$ are the same as or different from each other in each repeating unit, and each is independently a C6 to C30 divalent aromatic organic group containing at least one trifluoromethyl group (—$CF_3$); and the aromatic organic group exists alone, or two or more aromatic organic groups are bonded to each other to form a divalent condensed ring, or two or more aromatic organic groups are linked by a single bond, a fluorenylene group, —O—, —S—, —C(═O)—, —CH(OH)—, —S(═O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, or —C(═O)NH—; and $E^2$, $E^{2'}$, $E^3$, $E^{3'}$, $E^4$ and $E^{4'}$ are independently a single bond, or —NH—.

The second repeating unit and the third repeating unit are amide-derived repeating units. In the Chemical Formulae 2 and 3, the divalent linking group in the form of —C(═O)-A-C(═O)— is derived from at least one compound selected from the group consisting of diacyl halide, dicarboxylic acid, and dicarboxylate. In the second repeating unit, two —C(═O)— are bonded at para position with respect to A

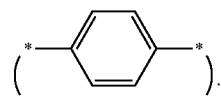

In the third repeating unit, two —C(═O)— are bonded at para position with respect to A

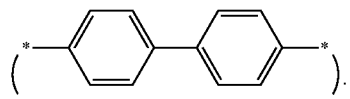

Preferably, the second repeating unit may include a repeating unit represented by the following Chemical Formula 2-1:

[Chemical Formula 2-1]

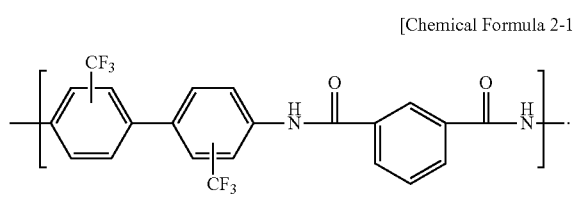

Preferably, the third repeating unit may include a repeating unit represented by the following Chemical Formula 3-1:

[Chemical Formula 3-1]

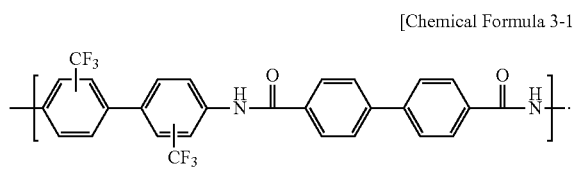

In the above-described polyamideimide block copolymer, a molar ratio of the second repeating unit and the third repeating unit is 10:90 to 50:50. By satisfying the molar ratio, thermal, mechanical, and optical properties of the copolymer can be simultaneously improved, and dimensional stability against moisture absorption can be relatively improved.

When the molar ratio of the second repeating unit and the third repeating unit is out of the above range, haziness may increase or yellowing may occur.

More specifically, the polyamideimide block copolymer may have a molar ratio of the imide block:the amide block of 3:7 to 6:4. By simultaneously satisfying the above molar ratio and the molar ratio of the second repeating unit and the third repeating unit, thermal, mechanical, and optical properties of the polyamideimide resin film can be simultaneously improved, and dimensional stability against moisture absorption can be relatively improved.

In the polyamideimide block copolymer, when the molar ratio of the imide block:the amide block is 3:7 to 4:6, the molar ratio of the second repeating unit:third repeating unit may be 20:80 to 50:50, or 30:70 to 45:55, and more preferably about 40:60. When the above molar ratios are simultaneously satisfied, mechanical, thermal, and optical properties of the polyamideimide resin film can be all improved to a high level, and dimensional stability against moisture absorption can be relatively improved.

In the polyamideimide block copolymer, when the molar ratio of the imide block:the amide block is 4.5:5.5 to 4:6, the molar ratio of the second repeating unit:third repeating unit may be 20:80 to 40:60. When the above molar ratios are simultaneously satisfied, mechanical, thermal, and optical properties of the polyamideimide resin film can be all improved to a high level, and dimensional stability against moisture absorption can be relatively improved.

Meanwhile, the polyamideimide block copolymer may further include a fourth repeating unit represented by the following Chemical Formula 4 in addition to the imide block and the amide block:

[Chemical Formula 4]

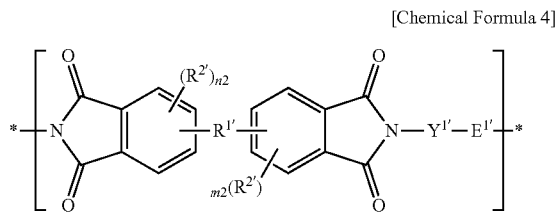

in Chemical Formula 4, each $R^{1'}$ is the same as or different from each other in each repeating unit, and each may independently comprise a C6 to C30 divalent aromatic organic group; and the aromatic organic group may exist alone, or two or more aromatic organic groups may be bonded to each other to form a divalent condensed ring, or two or more aromatic organic groups may be linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1=p≤10), —(CF$_2$)$_q$— (wherein, 1=q≤10), —C(CH$_3$)$_2$—, —C(CF$_3$)$_2$—, or —C(=O)NH—.

Each $R^2$ is the same as or different from each other in each repeating unit, and each may independently be —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

n3 and m3 may each independently be an integer of 0 to 3.

Each $Y^1$ is the same as or different from each other in each repeating unit, and each may independently be a C6 to C30 divalent aromatic organic group containing at least one trifluoromethyl group (—CF$_3$); and the aromatic organic group may exist alone, or two or more aromatic organic groups may be bonded to each other to form a divalent condensed ring, or two or more aromatic organic groups may be linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1=p≤10), —(CF$_2$)$_q$— (wherein, 1=q≤10), —C(CH$_3$)$_2$—, —C(CF$_3$)$_2$—, or —C(=O)NH—.

Each $E^{1'}$ may independently be a single bond, or —NH—.

As described above, since the polyamideimide block copolymer including both the imide block and the amide block satisfies the molar ratio of the second repeating unit and third repeating unit, and the molar ratio of the imide block and the amide block within a specific range, it is possible to simultaneously improve mechanical, thermal and optical properties of the copolymer, and dimensional stability against absorption can also be greatly improved.

The polyamideimide block copolymer may have a weight average molecular weight of 10,000 to 1,000,000 g/mol, preferably 15,000 to 800,000 g/mol.

The polyamide-imide copolymer may be prepared by a method including the steps of: mixing a compound forming the first repeating unit in an appropriate solvent to initiate a reaction; adding a compound forming the second repeating unit to the reaction mixture to react; adding a compound forming the third repeating unit to the reaction mixture to react; and inducing a chemical imidization reaction by adding a compound such as acetic anhydride or pyridine to the reaction mixture or inducing a thermal imidization reaction of amic acids by azeotropic distillation.

More specifically, the polyamideimide block copolymer may be prepared by a synthesis step of a polyamideimide block copolymer including: an initiation step of reacting a diamine compound with an aromatic tetracarboxylic acid or an anhydride thereof; and a step of reacting the product of the initiation step with a mixture containing isophthalic acid or a derivative thereof: a derivative of terephthalic acid in a molar ratio of 10:90 to 50:50 and an aromatic diamine.

Meanwhile, specific examples of the diamine compound and the aromatic tetracarboxylic acid or an anhydride thereof are not limited. For example, a diamine compound capable of forming the repeating unit of Chemical Formula 1 (for example, diamine including $Y^1$ of Chemical Formula 1), or an aromatic tetracarboxylic acid or an anhydride thereof (for example, tetracarboxylic acid or an anhydride thereof having a chemical structure excluding —$Y^1$-$E^1$- in Chemical Formula 1) can be used.

Meanwhile, the polyamideimide block copolymer may be formed by the step of reacting the imide block formed above with a mixture containing isophthalic acid or a derivative thereof: a derivative of terephthalic acid in a molar ratio of 10:90 to 50:50 and an aromatic diamine.

In the step of synthesizing the polyamideimide block copolymer, chemical imidization or thermal imidization of the product of the initiation step may be included. More specifically, with respect to the product of the initiation step, a step of inducing a chemical imidization reaction by adding acetic anhydride or pyridine, or a step of inducing a thermal imidization reaction of an amic acid by azeotropic distillation may be performed. The thermal imidization may be performed at a temperature of 100° C. or higher, 100° C. to 350° C., or 150° C. to 250° C.

And, when the polyamideimide block copolymer further includes the fourth repeating unit, it may be prepared by a method including the steps of: mixing a compound forming the first repeating unit in an appropriate solvent to initiate a reaction; adding a compound forming the second repeating unit to the reaction mixture to react; adding a compound forming the third repeating unit to the reaction mixture to react; adding a compound forming the fourth repeating unit to the reaction mixture to react; and inducing a chemical imidization reaction by adding a compound such as acetic anhydride or pyridine to the reaction mixture or inducing a thermal imidization reaction of amic acids by azeotropic distillation.

The polyamideimide block copolymer may be prepared by low-temperature solution polymerization, interfacial polymerization, melt polymerization, solid phase polymerization, or the like.

As described above, the cover window for a flexible display device of the embodiment may include a hard coating layer formed on at least one surface of the polymer substrate and having a pencil hardness of 5H or more under a load of 750 g.

The hard coating layer may have a pencil hardness of 5H or more, 6H or more, or 7H or more under a load of 750 g.

As described above, flexibility can be generally secured in a film or optical laminate having a thin thickness, but it is not easy to secure durability against repetitive bending or folding while maintaining high surface strength.

On the other hand, the cover window for a flexible display device of the embodiment has the above-described features by including a hard coating layer having high hardness and high durability against repetitive bending or folding operations together with the polymer substrate with the above-described features.

Specifically, the hard coating layer may include a binder resin.

Specific examples of the binder resin are not particularly limited, and the binder resin may be, for example, a polymer or copolymer of monomer(s) having a photocurable reactor. Specifically, it may be a polymer or copolymer formed from (meth)acrylate-based monomers or oligomers, vinyl-based monomers or oligomers, or the like.

For example, the binder resin may include a polymer or copolymer of 3- to 6-functional (meth)acrylate-based monomers.

The 3- to 6-functional acrylate-based monomer or oligomer may be trimethylolpropane triacrylate (TMPTA), trimethylolpropaneethoxy triacrylate (TMPEOTA), glycerin propoxylated triacrylate (GPTA), pentaerythritol tetra acrylate (PETA) or dipentaerythritol hexaacrylate (DPHA). The 3- to 6-functional acrylate-based monomer or oligomer may be used alone or in combination of different types.

The (meth)acrylate-based monomer or oligomer or vinyl-based monomer or oligomer may have a weight average molecular weight (Mw) of about 200 to about 2,000 g/mol, about 200 to about 1,000 g/mol, or about 200 to about 500 g/mol.

The 3- to 6-functional acrylate-based monomer may have an acrylate equivalent weight of about 50 to about 300 g/mol, about 50 to about 200 g/mol, or about 50 to about 150 g/mol.

In addition, the binder resin may include a cross-linked copolymer of a 3- to 6-functional acrylate-based monomer with a 7- to 20-functional urethane acrylate-based monomer or oligomer.

The 7- to 20-functional urethane acrylate-based monomer or oligomer is cross-linked with the 3- to 6-functional acrylate-based monomer or oligomer to form a copolymer, and may impart high hardness, flexibility and impact resistance to the coating layer formed after curing. The 7- to 20-functional urethane acrylate-based monomer or oligomer may be used alone or in combination of different types.

The cross-linked copolymer may contain the 3- to 6-functional acrylate-based monomer or oligomer and the 7- to 20-functional urethane acrylate-based monomer or oligomer in a weight ratio of about 1:9 to about 5:5, preferably 1:9 to about 4:6, more preferably about 1:9 to about 3.5:6.5. By including the cross-linked copolymer in which the 3- to 6-functional acrylate-based monomer or oligomer and the 7- to 20-functional urethane acrylate-based are cross-linked in the weight ratio described above, it can exhibit sufficient flexibility and achieve good physical properties such as high hardness at the same time.

The 7- to 20-functional urethane acrylate-based monomer or oligomer may have a weight average molecular weight of about 2,000 to about 8,000 g/mol, about 3,000 to about 6,000 g/mol, or about 3,000 to about 5,000 g/mol, which may be preferable for the optimization of physical properties of the coating layer.

In addition, the hard coating layer may include inorganic nanoparticles dispersed in the binder resin.

The inorganic particles may be, for example, a metal atom such as silica, aluminum, titanium, and zinc, or an oxide or nitride thereof, and silica particles, aluminum oxide particles, titanium oxide particles, or zinc oxide particles may be used.

The inorganic nanoparticles may have an average radius of 100 nm or less, or 5 to 100 nm.

The hard coating layer may include two or more types of inorganic particles having different average radii together with the binder resin. In this case, the two or more types of inorganic particles may include first inorganic particles having an average radius of 20 to 35 nm and second inorganic particles having an average radius of 40 to 130 nm.

The average radius of each of the first inorganic particles and the second inorganic particles can be confirmed by a commonly known method. For example, it may be calculated and derived by measuring a radius of individual particles identified in an electron micrograph (SEM, TEM, etc.) of the hard coating layer, or may be calculated through X-ray scattering experiments.

Meanwhile, a content of the inorganic nanoparticles included in the hard coating layer is not particularly limited, but preferably, the hard coating layer may include 20 to 80 parts by weight of the inorganic nanoparticles based on 100 parts by weight of the binder resin.

When the content of the inorganic nanoparticles included in the hard coating layer is too small, hardness of the hard coating layer may be lowered. In addition, when the content of the inorganic nanoparticles included in the hard coating layer is too high, hardness may be increased, but flexibility of the cover window may be significantly reduced or durability against repetitive bending or folding operations may also be reduced.

The polymer substrate may have a thickness of 5 μm to 300 μm, 20 μm to 200 μm, or 20 μm to 100 μm. If the thickness of the substrate is less than 5 μm, there is a risk of breakage or curl when forming the coating layer, and it may be difficult to achieve high hardness. On the other hand, if the thickness exceeds 300 μm, flexibility may be reduced and a flexible film may be difficult to form.

The hard coating layer may have a thickness of 5 μm to 50 μm. When the thickness of the hard coating layer is excessively thick, flexibility or durability against repetitive bending or folding operations of the cover window for a flexible display device may be deteriorated.

Meanwhile, the cover window for a flexible display device may be provided by applying a coating composition for forming the hard coating layer on at least one surface of the polymer substrate and photocuring it.

The method of coating the coating composition is not particularly limited, as long as it can be used in the related art. For example, a bar-coating method, a knife-coating method, a roll-coating method, a blade-coating method, a die-coating method, a microgravure-coating method, a comma-coating method, a slot die-coating method, a lip-coating method, or a solution casting method may be used.

At least one selected from a layer, a membrane, a film and the like such as a plastic resin film, a cohesive film, a release film, a conductive film, a conductive layer, a liquid crystal layer, a coating layer, a cured resin layer, a non-conductive film, a metal mesh layer or a patterned metal layer may be included on the top surface of the hard coating layer or between the polymer substrate and the hard coating layer.

For example, an antistatic layer having conductivity may be first formed on a substrate, and then a coating layer may be formed thereon to provide an anti-static function, or a low refractive layer may be introduced on the coating layer to implement a low reflection function.

Further, the layer, membrane, film or the like may be in any form of a single layer, a double layer, or a laminate type. The layer, membrane, film or the like may be formed by laminating a freestanding film with an adhesive, a cohesive film, or the like, or may be laminated on the coating layer by a method such as coating, vapor deposition, sputtering, or the like, but the present invention is not limited thereto.

Meanwhile, the hard coating layer may further include additives commonly used in the art, such as a photoinitiator, an organic solvent, a surfactant, a UV absorber, a UV stabilizer, an anti-yellowing agent, a leveling agent, an antifouling agent, a dye for improving the color value, etc., in addition to the above-mentioned binder resin, and inorganic fine particles. Further, the content thereof is not particularly limited as it can be variously adjusted within the range that does not deteriorate physical properties of the hard coating layer. However, they may be contained in an amount of about 0.01 to 30 parts by weight based on 100 parts by weight of the hard coating layer.

The surfactant may be a mono- or bi-functional fluorine-based acrylate, a fluorine-based surfactant, or a silicon-based surfactant. In this case, the surfactant may be contained in a form of being dispersed or cross-linked in the hard coating layer.

Further, the additive may include a UV absorber, or a UV stabilizer, and examples of the UV absorber may include a benzophenone-based compound, a benzotriazole-based compound, a triazine-based compound, and the like. Examples of the UV stabilizer may include tetramethyl piperidine, and the like.

Examples of the photoinitiator may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio) phenyl]-2-(4-morpholinyl)-1-propanone diphenyl(2,4,6-trimethylbenzoyl)-phosphine oxide, or bis(2,4,6-trimethylbenzoyl)-phenylphosphine oxide, and the like, but are not limited thereto. In addition, examples of commercially available products include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators can be used alone or in combination of two or more.

Examples of the organic solvent may include alcohol-based solvents such as methanol, ethanol, isopropyl alcohol and butanol; alkoxy alcohol-based solvents such as 2-methoxyethanol, 2-ethoxyethanol and 1-methoxy-2-propanol; ketone-based solvents such as acetone, methyl ethyl ketone, methyl isobutyl ketone, methyl propyl ketone and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether and diethylene glycol-2-ethylhexyl ether; aromatic solvent such as benzene, toluene and xylene, and the like. These may be used alone or in combination.

Meanwhile, according to another embodiment of the present disclosure, there is provided a flexible display device including the cover window for a flexible display device of the embodiment.

The flexible display device may include a touch panel of a curved, bendable, flexible, rollable, or foldable mobile communication device, smartphone or tablet PC and various displays.

An example of the flexible display device is a flexible light emitting element display device.

For example, the organic light emitting diode (OLED) display may have a cover window of the flexible display device at an outer part in a direction in which light or a screen is emitted. And a cathode for providing electrons, an electron transport layer, an emission layer, a hole transport layer, and an anode for providing holes may be sequentially formed.

In addition, the organic light emitting diode (OLED) display may further include a hole injection layer (HIL) and an electron injection layer (EIL).

In order for the organic light emitting diode (OLED) display to function and act as a flexible display, the electrodes of the cathode and the anode and each component may use an elastic material in addition to using the polymer film as a cover window.

Another example of the flexible display device may be a rollable display or a foldable display.

The rollable display device may have various structures depending on application fields and specific forms, and may have a structure including a cover plastic window, a touch panel, a polarizing plate, a barrier film, a light emitting element (OLED element, etc.), a transparent substrate, and the like.

Advantageous Effects

According to the present disclosure, there are provided a flexible display device and a cover window for a flexible display device which exhibits high hardness while satisfying a property balance of flexibility and high hardness at the same time, and is hardly damaged by repetitive bending or folding operations, thereby easily applied to a bendable, flexible, rollable, or foldable mobile device, or display device.

Since the cover window for a flexible display device may have sufficient properties to replace tempered glass, or the like, it may not only be broken by pressure or force applied from the outside, but also may have characteristics of being sufficiently bent and folded. Moreover, it exhibits flexibility, high hardness, scratch resistance, and high transparency, and has little damage to the film even under repetitive and continuous bending or long-time folding. Accordingly, it may be usefully applied to a mobile device, a display device, a front board of various instrument panels, and a display unit with a bendable, flexible, rollable, or foldable type.

BRIEF DESCRIPTION OF THE DRAWINGS

FIG. 1 schematically shows a method of performing a bending durability test and a bending stability test of Experimental Examples 7 and 8.

Hereinafter, the function and effect of the present invention will be described in more detail through specific examples. However, these examples are for illustrative purposes only, and the invention is not intended to be limited by these examples.

PREPARATION EXAMPLE A: PREPARATION OF COATING SOLUTION FOR FORMING HARD COATING LAYER

PREPARATION EXAMPLE A-1

As shown in Table 1 below, 30 g of trimethylolpropane triacrylate (TMPTA, manufactured by Cytec, Mw=296 g/mol, acrylate group equivalent weight=99 g/mol) as a trifunctional acrylate-based binder, 40 g of MU9800 (manufactured by Miwon, Mw=3500 g/mol, acrylate group equivalent weight=389 g/mol) as a 9-functional urethane acrylate-based binder, 30 g of MU9020 (manufactured by Miwon, Mw=4500 g/mol, acrylate group equivalent weight=450 g/mol) as a 10-functional urethane acrylate-based binder, 1 g of Irgacure 184 (manufactured by Ciba) as a photoinitiator, and 17.5 g of methyl ethyl ketone (MEK) were mixed to prepare an acrylate solution.

60 g of a solution in which silica particles S1 (average particle diameter: 20 nm, surface-modified with a methacrylate silane coupling agent) were dispersed in n-butyl acetate (normal butyl acetate) in an amount of 50 wt %, and 100 g of a solution in which silica particles S2 (average particle diameter: 40 nm, surface-modified with an acrylate silane coupling agent) were dispersed in methyl ethyl ketone (MEK) in an amount of 30 wt % were mixed with the resulting acrylate solution to prepare a coating solution for forming a hard coating layer.

PREPARATION EXAMPLE A-2

A coating solution for forming a hard coating layer was prepared in the same manner as in Preparation Example A-1, except that 1) an acrylate solution was prepared using 26.1 g of methyl ethyl ketone, and 2) 50 g of the solution in which silica particles S2 were dispersed in methyl ethyl ketone (MEK) in an amount of 30 wt % was used.

PREPARATION EXAMPLE A-3

A coating solution for forming a hard coating layer was prepared in the same manner as in Preparation Example A-1, except that 1) an acrylate solution was prepared using 21.8 g of methyl ethyl ketone, and 2) 75 g of a solution in which silica particles S3 (average particle diameter: 100 nm, surface-modified with an acrylate silane coupling agent) were dispersed in an amount of 40 wt % was used instead of 100 g of the solution in which silica particles S2 were dispersed in methyl ethyl ketone (MEK) in an amount of 30 wt %.

PREPARATION EXAMPLE A-4

As shown in Table 1 below, 30 g of TMPTA (manufactured by Cytec, Mw=296 g/mol, acrylate group equivalent weight=99 g/mol), 40 g of MU9800 (manufactured by Miwon, Mw=3500 g/mol, acrylate group equivalent weight=389 g/mol), 30 g of MU9020 (manufactured by Miwon, Mw=4500 g/mol, acrylate group equivalent weight=450 g/mol), 1 g of Irgacure 184 (manufactured by Ciba), and 43.3 g of methyl ethyl ketone (MEK) were mixed to prepare a coating solution for forming a hard coating layer.

PREPARATION EXAMPLE A-5

30 g of TMPTA (manufactured by Cytec, Mw=296 g/mol, acrylate group equivalent weight=99 g/mol), 40 g of MU9800 (manufactured by Miwon, Mw=3500 g/mol, acrylate group equivalent weight=389 g/mol), 30 g of MU9020 (manufactured by Miwon, Mw=4500 g/mol, acrylate group equivalent weight=450 g/mol), 1 g of Irgacure 184 (manufactured by Ciba), and 30.5 g of methyl ethyl ketone (MEK) were mixed to prepare an acrylate solution.

90 g of a solution in which silica particles S1 (average particle diameter: 20 nm, surface-modified with a methacrylate silane coupling agent) were dispersed in n-butyl acetate (normal butyl acetate) in an amount of 50 wt % was mixed with the resulting acrylate solution to prepare a coating solution for forming a hard coating layer.

PREPARATION EXAMPLE A-6

30 g of TMPTA (manufactured by Cytec, Mw=296 g/mol, acrylate group equivalent weight=99 g/mol), 40 g of MU9800 (manufactured by Miwon, Mw=3500 g/mol, acrylate group equivalent weight=389 g/mol), 30 g of MU9020 (manufactured by Miwon, Mw=4500 g/mol, acrylate group equivalent weight=450 g/mol), 1 g of Irgacure 184 (manufactured by Ciba), and 24 g of methyl ethyl ketone (MEK) were mixed to prepare an acrylate solution.

112.5 g of a solution in which silica particles S3 (average particle diameter: 100 nm, surface-modified with an acrylate silane coupling agent) were dispersed in an amount of 40 wt % was mixed with the resulting acrylate solution to prepare a coating solution for forming a hard coating layer.

TABLE 1

| | Manufacturer, product name | Prep. Ex. A-1 | Prep. Ex. A-2 | Prep. Ex. A-3 | Prep. Ex. A-4 | Prep. Ex. A-5 | Prep. Ex. A-6 |
|---|---|---|---|---|---|---|---|
| Acrylate-based binder (unit:g) | Cytec, TMPTA | 30 | 30 | 30 | 30 | 30 | 30 |
| | Miwon, MU9800 | 40 | 40 | 40 | 40 | 40 | 40 |
| | Miwon, MU9020 | 30 | 30 | 30 | 30 | 30 | 30 |
| Inorganic fine particles* (unit:g) | S1 | 30 | 30 | 30 | | 45 | |
| | S2 | 30 | 15 | | | | — |
| | S3 | | | 30 | | | 45 |

*In Table 1, the content of inorganic fine particles is represented by a net weight of only the inorganic fine particles excluding the solvent according to the weight percentage of the inorganic fine particles dispersed in the solvent.

PREPARATION EXAMPLE B: SYNTHESIS OF POLYAMIDE-IMIDE COPOLYMER AND PREPARATION OF POLYMER SUBSTRATE

PREPARATION EXAMPLE B-1

2,2'-bis(trifluoromethyl)benzidine, 4,4'-(hexafluoroisopropylidene)diphthalic anhydride and dimethylacetamide were placed in a round flask equipped with a dean-stark apparatus and a condenser, and the reaction was initiated at room temperature. The reaction mixture was stirred using ice water at 0° C. for 4 hours under a nitrogen atmosphere.

After 4 hours, the reaction product was taken out to room temperature, and 2,2'-bis(trifluoromethyl)benzidine, isophthaloyl dichloride (IPC), 4,4'-biphenyldicarbonyl chloride (BPC) and dimethylacetamide were added thereto. Thereafter, the reaction was initiated at room temperature under a nitrogen atmosphere.

After the formation of a polyamic acid polymer by the reaction for 4 hours, acetic anhydride and pyridine were added to the reaction mixture, and the mixture was stirred in an oil bath at about 40° C. for 15 hours to carry out a chemical imidization reaction.

After the completion of the reaction, the reaction mixture was precipitated in water and ethanol (1:1 (v/v)) to obtain a polyamide-imide block copolymer A-1 having the following first repeating unit, second repeating unit and third repeating unit (weight average molecular weight: about 200,000 g/mol). The obtained copolymer had a molar ratio of the first repeating unit:the second repeating unit and the third repeating unit (①) of 50:50 and a molar ratio of the second repeating unit:and the third repeating unit (②) of 20:80.

[The first repeating unit]—The imide repeating unit

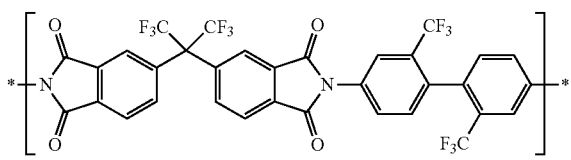

[The second repeating unit]—The amide repeating unit (derived from IPC)

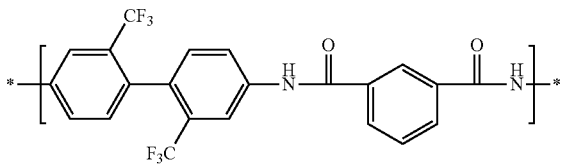

[The third repeating unit]—The amide repeating unit (derived from BPC)

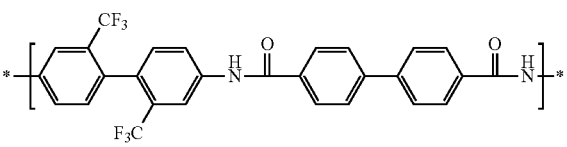

Thereafter, the polyamide-imide block copolymer obtained above was dissolved in dimethylacetamide to prepare a solution of about 10 wt %. The solution was cast on a glass plate using a bar coater and a drying temperature was controlled to 120° C. and 200° C. in sequence. A polymer substrate including the polyamide-imide block copolymer having a thickness of 50 μm was obtained.

PREPARATION EXAMPLES B-2 TO B-4

Polyamide-imide copolymers were prepared by controlling the amount of the respective monomers so as to satisfy the molar ratios shown in Table 2 below.

Then, polymer substrates including one of the polyamide-imide block copolymer were prepared in the same manner as in Preparation Example B-1.

TABLE 2

| Index | Imide:Amide - ① | The ratio of amide repeating units - ② Kinds | Ratio | Mw of copolymer | Y.I. | Haze | Elastic modulus |
|---|---|---|---|---|---|---|---|
| Prep. Ex. B-1 | 50:50 | IPC:BPC | 20:80 | 520,000 | 4.00 | 0.90 | 5.69 |
| Prep. Ex. B-2 | 40:60 | IPC:BPC | 20:80 | 420,000 | 4.30 | 0.85 | 5.88 |
| Prep. Ex. B-3 | 40:60 | IPC:BPC | 30:70 | 360,000 | 3.50 | 0.55 | 5.53 |
| Prep. Ex. B-4 | 40:60 | IPC:BPC | 40:60 | 270,000 | 3.30 | 0.51 | 5.36 |

* Imide:Amide ① represents a molar ratio of the first repeating unit: the second repeating unit + the third repeating unit.

* The ratio of amide repeating units ② represents a molar ratio of the second repeating unit (or the 2-2 repeating unit): the third repeating unit (or the 2-2 repeating unit).

* Y.I. (Yellow Index): The yellow index of the polyamide-imide film sample (thickness: 50 ± 2 μm) was measured according to the method of ASTM D1925 using a COH-400 Spectrophotometer (manufactured by NIPPON DENSHOKU INDUSTRIES).

* Haze: The haze of the polyamide-imide film sample (thickness: 50 ± 2 μm) was measured according to the method of ASTM D1003 using a COH-400 Spectrophotometer (manufactured by NIPPON DENSHOKU INDUSTRIES).

* Elastic Modulus (GPa): The elastic modulus of the polyamide-imide film sample (thickness: 50 ± 2 μm) was measured using Zwich/Roell z005 (5 kN) under a strain rate of 12.5 mm/min.

EXAMPLES 1 TO 6 AND COMPARATIVE EXAMPLE 1: COVER WINDOW FOR FLEXIBLE DISPLAY DEVICE

The coating composition prepared in Preparation Example A was applied to both surfaces of the polymer substrate prepared in Preparation Example B by a bar coating method, and dried at 90° C. under an air atmosphere for 2 minutes. An optical laminate was prepared by photo-curing with a metal halide lamp having a wavelength of 290 to 320 nm (amount of light: 200 mJ/cm$^2$). After the curing was completed, the thickness of the coating layer formed on both surfaces was 10 μm, respectively.

Examples and Comparative Example are shown in Tables 3 and 4 below.

TABLE 3

|  | Example 1 | Example 2 | Example 3 | Example 4 | Example 5 | Example 6 |
| --- | --- | --- | --- | --- | --- | --- |
| Coating composition | Prep. Ex. A-1 | Prep. Ex. A-2 | Prep. Ex. A-3 | Prep. Ex. A-1 | Prep. Ex. A-1 | Prep. Ex. A-1 |
| Polymer substrate | Prep. Ex. B-1 | Prep. Ex. B-1 | Prep. Ex. B-1 | Prep. Ex. B-2 | Prep. Ex. B-3 | Prep. Ex. B-4 |
| Total thickness | 70 μm | 70 μm | 70 μm | 70 μm | 70 μm | 70 μm |
| Thickness of coating layer | 10 μm | 10 μm | 10 μm | 10 μm | 10 μm | 10 μm |

TABLE 4

|  | Comparative Example 1 |
| --- | --- |
| Coating composition | — |
| Polymer substrate | Prep. Ex. B-1 |
| Total thickness | 70 μm |
| Thickness of coating layer | 10 μm |

EXPERIMENTAL EXAMPLE: MEASUREMENT OF PHYSICAL PROPERTIES OF OPTICAL LAMINATE

EXPERIMENTAL EXAMPLE 1: PENCIL HARDNESS

The maximum hardness without scratches was confirmed for the hard coating layer formed on the front surface in each cover window of Examples and Comparative Example after moving a pencil back and forth three times at an angle of 45 degrees under a load of 750 g using a pencil hardness tester in accordance with JIS K5400-5-4.

EXPERIMENTAL EXAMPLE 2: TRANSMITTANCE AND HAZE

The transmittance and haze of each cover window of Examples and Comparative Example were measured using a spectrophotometer (apparatus name: COH-400).

EXPERIMENTAL EXAMPLE 3: YELLOW INDEX (Y.I.)

The yellow index (Y.I.) of each cover window of Examples and Comparative Example was measured using a spectrophotometer (apparatus name: COH-400 manufactured by NIPPON DENSHOKU INDUSTRIES) in accordance with ASTM E 313.

EXPERIMENTAL EXAMPLE 4: BENDING TEST

Each cover window of Examples and Comparative Example was interposed and wound on cylindrical mandrels with various diameters, and then the minimum diameter at which no crack occurred was measured in accordance with JIS K5600-5-1.

EXPERIMENTAL EXAMPLE 5: COATING LAYER ADHESION

Scratches were made to make 100 lattices using a cutter knife on the entire surface of the hard coating layer formed on the front surface of each cover window of Examples and Comparative Example within a size of 1 cm*1 cm to 2 cm*2 cm, and Nichiban Tape (CT-24) was attached thereon to perform a peeling test. The peeling test was performed twice on the same surface to evaluate the adhesion from 5B (no peeling) to 0B (full peeling) depending on the peeled level.

5B (no peeled parts)
4B (1 to 5 lattices containing peeled parts)
3B (6 to 15 lattices containing peeled parts)
2B (16 to 35 lattices containing peeled parts)
1 B (36 to 50 lattices containing peeled parts)
0B (51 or more lattices containing peeled parts)

EXPERIMENTAL EXAMPLE 6: SCRATCH RESISTANCE TEST

For the hard coating layer formed on the front surface of each cover window of Examples and Comparative Example, a load of 500 gf was applied to steel wool (#0000) and reciprocated 500 times at 30 rpm to evaluate the surface of the hard coating film. When 1 or less scratch with 1 cm or less was observed with the naked eye, it was judged as excellent.

EXPERIMENTAL EXAMPLE 7: BENDING DURABILITY TEST

FIG. 1 schematically shows a method of performing a bending durability test and a bending stability test on a film according to an embodiment of the present disclosure.

Each film of Examples and Comparative Examples was cut, but laser cutting was performed into a size of 80×140 mm so as to minimize fine cracks at the edge portions. The laser cut film was placed on a measuring equipment and set so that an interval between folded portions was 4 mm. Then, a process of folding and unfolding both sides of the film at 90 degrees with respect to the bottom at room temperature was repeated 10,000 times by continuous operations (the speed at which the film was folded was once every 1.5 seconds).

After repeating 10,000 times, the film was peeled off, and it was observed whether or not cracks of 3 mm or more in length occurred (OK, NG). When cracks did not occur, the film was again folded 10,000 times and whether or not cracks occurred was repeatedly observed, thereby measuring the maximum number of repetitions that cracks do not occur. When cracks did not occur up to 100,000 times of repetitions, the bending durability was judged to be excellent.

EXPERIMENTAL EXAMPLE 8: BENDING STABILITY TEST

Similarly to the bending durability test, each film of Examples and Comparative Examples was cut, but laser cutting was performed into a size of 80×140 mm so as to minimize fine cracks at the edge portions.

The laser cut film was placed on a fixing device and set so that an interval between folded portions was 4 mm. After leaving both sides of the film folded at 90 degrees with respect to the bottom for 24 hours, the film was then peeled off and turned over so that the folded portion went downward. Then, a □(square)-shaped SUS structure was placed thereon and the film was fixed. The 3D image of the film shape was measured with a noncontact-type surface roughness measuring instrument (PLUTO 681, Dukin Co., Ltd., use of 605 nm laser, resolution 0.1 µm), and the maximum value of the height Z lifted from the bottom was measured as the bending stability.

In order to measure the recovery of the film, the film in which the bending stability was measured was allowed to stand at room temperature for 1 hour, and then the maximum value of the lifted height Z was again measured. A change in appearance of the folded portion was visually observed.

When Z is 0.1 mm or less and the change in appearance such as traces on the folded portions is small, it is judged to be OK, and when Z exceeds 0.1 mm or a large number of traces remain on the folded portions, it is judged to be NG.

The results of measuring the physical properties of Examples 1 to 5 and Comparative Examples 1 to 5 are shown in Tables 5 and 6 below.

TABLE 5

| | Example 1 | Example 2 | Example 3 | Example 4 | Example 5 | Example 6 |
|---|---|---|---|---|---|---|
| Transmittance | 91.60% | 92.03% | 92.09% | 92.03% | 92.15% | 91.19% |
| Haze | 0.75% | 0.71% | 0.80% | 0.72% | 0.40% | 0.48% |
| YI | 3.34% | 3.30% | 3.47% | 3.54% | 2.71% | 2.67% |
| Pencil Hardness | 7 H | 8 H | 7 H | 6 H | 7 H | 6 H |
| Coating layer adhesion | OK | OK | OK | OK | OK | OK |
| Scratch resistance | Excellent | Excellent | Excellent | Excellent | Excellent | Excellent |
| Flexibility test | 4 mm | 4 mm | 4 mm | 4 mm | 5 mm | 5 mm |
| Bending durability | 100,000 times Ok | 100,000 times Ok | 100,000 times Ok | 100,000 times Ok | 100,000 times Ok | 110,000 times Ok |
| Bending stability | 0.1 mm | 0.1 mm | 0.1 mm | 0.2 mm | 0.1 mm | 0.2 mm |

TABLE 6

| | Comparative Example 1 |
|---|---|
| Transmittance | 89.12% |
| Haze | 0.90% |
| YI | 4 |
| Pencil Hardness | 2 H |
| Coating layer adhesion | — |
| Scratch resistance | NG |
| Flexibility test | 2 mm |
| Bending durability | 100,000 times OK |
| Bending stability | 0.4 mm |

As shown in Tables 5 and 6, the cover windows for a flexible display device of Examples satisfied sufficient flexibility while simultaneously exhibiting glass-level high hardness. Particularly, they were confirmed that the film was hardly damaged by repetitive bending or folding operations, thereby easily applied to a bendable, flexible, rollable, or foldable mobile device, or display device.

On the other hand, the cover window of Comparative Example had a relatively low surface hardness or did not exhibit bending durability enough to be used as a cover window for a flexible display device.

The invention claimed is:
1. A cover window for a flexible display device, comprising:
   a polymer substrate comprising a polyamideimide block copolymer having a repeating unit containing an aromatic group; and
   a hard coating layer formed on at least one surface of the polymer substrate and having a pencil hardness of at least 5H under a load of 750 g, wherein no crack occurs on the cover window when the cover window is wound on a mandrel having a diameter of 3 mm, wherein the polyamideimide block copolymer comprises an imide block having a first repeating unit represented by Chemical Formula 1; and an amide block having a second repeating unit represented by Chemical Formula 2 and a third repeating unit represented by Chemical Formula 3:

[Chemical Formula 1]

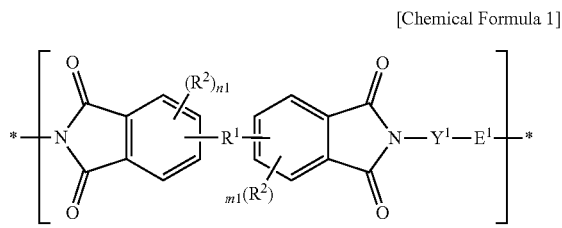

in the Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a C6 to C30 divalent aromatic organic group;

each $R^2$ is the same as or different from each other in each repeating unit, and each is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are each independently an integer of 0 to 3;

each $Y^1$ is the same as or different from each other in each repeating unit, and each independently comprises a C6 to C30 divalent aromatic organic group containing at least one trifluoromethyl group (—CF$_3$); and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_1$— (wherein, 1≤p≤10), —(CF$_2$)$_q$— (wherein, 1≤q≤10), —C(CH$_3$)$_2$—, —C(CF$_3$)$_2$—, or —C(=O)NH—; and each $E^1$ is independently a single bond, or —NH—;

[Chemical Formula 2]

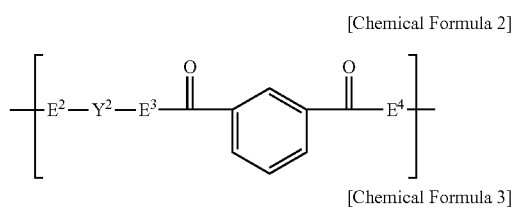

[Chemical Formula 3]

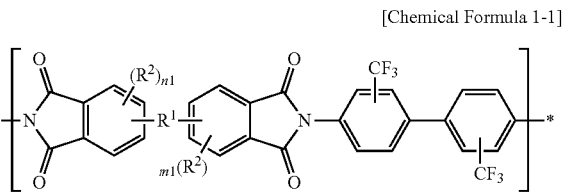

in the Chemical Formulae 2 and 3, $Y^2$ and $Y^{2'}$ are the same as or different from each other in each repeating unit, and each is independently a C6 to C30 divalent aromatic organic group containing at least one trifluoromethyl group (—CF$_3$); and the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, or —C(=O)NH—; and $E^2$, $E^{2'}$, $E^3$, $E^{3'}$, $E^4$ and $E^{4'}$ are independently a single bond, or —NH—, and wherein a molar ratio of the imide block:the amide block is 3:7 to 4:6, and a molar ratio of the second repeating unit: the third repeating unit is 30:70 to 45:55.

2. The cover window for a flexible display device of claim 1, wherein a yellow index of the polymer substrate measured in accordance with ASTM D1925 is 4.5 or less, and a haze of the polymer substrate measured in accordance with ASTM D1003 is 1.1% or less.

3. The cover window for a flexible display device of claim 1, wherein an elastic modulus of the polymer substrate measured at a strain rate of 12.5 mm/min is at least 5 GPa.

4. The cover window for a flexible display device of claim 1, wherein the cover window has a transmittance with respect to light having a wavelength of 550 nm of at least 90.0% and a haze of 1.00% or less.

5. The cover window for a flexible display device of claim 1, wherein the first repeating unit comprises a repeating unit represented by Chemical Formula 1-1:

[Chemical Formula 1-1]

in the Chemical Formula 1-1, $R^1$, $R^2$, n1 and m1 are as defined in the Chemical Formula 1.

6. The cover window for a flexible display device of claim 1, wherein the second repeating unit comprises a repeating unit represented by Chemical Formula 2-1 and the third repeating unit comprises a repeating unit represented by Chemical

[Chemical Formul 2-1]

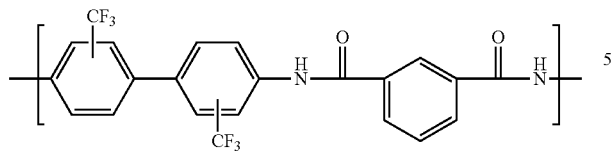

and

[Chemical Formula 3-1]

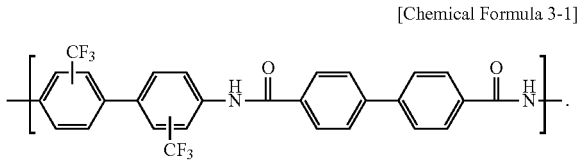

7. The cover window for a flexible display device of claim 1, wherein the polyamideimide block copolymer has a weight average molecular weight of 10,000 to 1,000,000 g/mol.

8. The cover window for a flexible display device of claim 1, wherein the polymer substrate has a thickness of 5 to 300 μm.

9. The cover window for a flexible display device of claim 1, wherein the hard coating layer comprises a binder resin and inorganic nanoparticles, and has a thickness of 5 μm to 50 μm.

10. A flexible display device comprising the cover window for a flexible display device of claim 1.

* * * * *